(12) United States Patent
Patterson et al.

(10) Patent No.: US 12,655,863 B2
(45) Date of Patent: Jun. 16, 2026

(54) HOLLOW WALL MOUNTING DEVICE

(71) Applicants: Frank V. Patterson, Travelers Rest, SC (US); Tracy L. Yoho, New Fairfield, CT (US)

(72) Inventors: Frank V. Patterson, Travelers Rest, SC (US); Tracy L. Yoho, New Fairfield, CT (US)

(73) Assignee: Frank V. Patterson, Travelers Rest, SC (US)

( * ) Notice: Subject to any disclaimer, the term of this patent is extended or adjusted under 35 U.S.C. 154(b) by 138 days.

(21) Appl. No.: 18/211,223

(22) Filed: Jun. 16, 2023

(65) Prior Publication Data

US 2024/0418194 A1     Dec. 19, 2024

(51) Int. Cl.
*F16B 13/08*          (2006.01)
*F16B 11/00*          (2006.01)
*F16B 13/04*          (2006.01)

(52) U.S. Cl.
CPC ............ *F16B 13/04* (2013.01); *F16B 11/006* (2013.01); *F16B 13/0808* (2013.01)

(58) Field of Classification Search
CPC .......................... F16B 13/0808; F16B 11/006
USPC .................................................. 411/340, 344
See application file for complete search history.

(56) References Cited

U.S. PATENT DOCUMENTS

| | | | |
|---|---|---|---|
| 1,108,922 A | 9/1914 | Menten | |
| 1,506,123 A | 8/1924 | Hubener | |

| | | | |
|---|---|---|---|
| 1,849,804 A | 3/1932 | Pleister | |
| 1,878,579 A | 9/1932 | Gober | |
| 1,915,509 A | 6/1933 | Adam | |
| 1,956,623 A | 5/1934 | Pleister | |
| 2,013,503 A | 9/1935 | Pleister | |
| 2,061,634 A | 11/1936 | Pleister | |
| 2,092,341 A | 9/1937 | Vries | |
| 2,144,895 A | 1/1939 | Place | |
| 2,273,648 A | 2/1942 | Kost | |
| 2,301,135 A | 11/1942 | Malot | |
| 2,403,247 A | 7/1946 | Sullivan | |
| 2,567,372 A | 9/1951 | Gelpcke | |
| 2,765,134 A | 10/1956 | Hill | |
| 2,836,215 A | 5/1958 | Rapata | |
| 2,908,196 A | 10/1959 | Apfelzwig | |
| 2,945,705 A | 7/1960 | Murray | |

(Continued)

FOREIGN PATENT DOCUMENTS

| | | | |
|---|---|---|---|
| AU | 2004200862 C1 | 9/2010 | |
| CH | 516748 A | 12/1971 | |

(Continued)

*Primary Examiner* — Flemming Saether
(74) *Attorney, Agent, or Firm* — Blaine Childress

(57)          ABSTRACT

A recessed object mounting device comprising a contiguous self-supported back plate equipped with securing means, permanently adhered to the rear face of a hollow wall material. The plate includes primary bore securing means adapted to threadably engage terminal threads of an object mounting rod or screw. The invention includes installation grasping means to position and to draw an adhesive-loaded back plate inner surface into firm contact with the rear wall face a during adhesive bonding. The recessed self-supporting plate serves as a base for coupling a threaded object mounting screw when the screw is inserted from the front face of a hollow wall aperture.

1 Claim, 8 Drawing Sheets

(56) References Cited

U.S. PATENT DOCUMENTS

| | | | |
|---|---|---|---|
| 2,979,797 A | 4/1961 | Murphy | |
| 2,990,746 A | 7/1961 | Nichols | |
| 2,998,743 A | 9/1961 | Apfelzwig | |
| 3,127,808 A | 4/1964 | Drybread | |
| 3,175,452 A * | 3/1965 | Leitner | F16B 35/041 |
| | | | 411/340 |
| 3,211,042 A | 10/1965 | Fischer | |
| 3,244,056 A | 4/1966 | Kern | |
| 3,332,118 A | 7/1967 | Temple | |
| 3,389,631 A | 6/1968 | Vaillancourt | |
| 3,473,431 A | 10/1969 | King | |
| 3,490,300 A | 1/1970 | Toma | |
| 3,513,746 A | 5/1970 | Forsberg | |
| 3,605,547 A | 9/1971 | Millet | |
| 3,651,734 A | 3/1972 | McSherry | |
| 3,927,597 A | 12/1975 | Stults | |
| 4,043,245 A | 8/1977 | Kaplan | |
| 4,055,051 A | 10/1977 | Finney | |
| 4,075,924 A | 2/1978 | McSherry | |
| 4,100,833 A | 7/1978 | Nessa | |
| 4,120,231 A | 10/1978 | Neumayer | |
| 4,167,772 A | 9/1979 | Baehne | |
| 4,181,061 A | 1/1980 | McSherry | |
| 4,183,386 A | 1/1980 | Brown | |
| 4,221,154 A | 9/1980 | McSherry | |
| 4,283,986 A | 8/1981 | Peterson | |
| 4,285,183 A * | 8/1981 | Condit | E04G 23/0207 |
| | | | 52/514 |
| 4,285,264 A | 8/1981 | Einhom | |
| 4,286,497 A | 9/1981 | Shamah | |
| 4,294,156 A | 10/1981 | McSherry | |
| 4,303,354 A | 12/1981 | McDowell | |
| 4,318,651 A * | 3/1982 | Ragen | F16B 37/12 |
| | | | 411/392 |
| 4,432,683 A * | 2/1984 | Polos | F16B 13/0808 |
| | | | 411/340 |
| 4,439,079 A | 3/1984 | Losada | |
| 4,453,869 A | 6/1984 | Cremieux | |
| 4,502,826 A | 3/1985 | Fafard | |
| 4,573,844 A | 3/1986 | Smith | |
| 4,650,386 A | 3/1987 | McSherry | |
| 4,657,461 A | 4/1987 | Smith | |
| 4,673,150 A | 6/1987 | McSherry | |
| 4,704,057 A | 11/1987 | McSherry | |
| 4,752,170 A | 6/1988 | McSherry | |
| 4,861,198 A | 8/1989 | Stankus | |
| 4,865,501 A | 9/1989 | Ferris | |
| 4,943,253 A | 7/1990 | Smith | |
| 4,978,265 A | 12/1990 | De Wan | |
| 5,007,223 A * | 4/1991 | Holland | E04B 2/7457 |
| | | | 411/344 |
| 5,033,949 A * | 7/1991 | Jewett | E04G 23/0203 |
| | | | 52/514 |
| 5,110,243 A | 5/1992 | Oh | |
| 5,147,166 A | 9/1992 | Harker | |
| 5,221,169 A * | 6/1993 | McSherry | F16B 13/0808 |
| | | | 411/344 |
| 5,314,154 A | 5/1994 | O'Grady | |
| 5,425,609 A | 6/1995 | Smith | |
| 5,791,845 A | 8/1998 | Fulop | |
| 6,161,999 A | 12/2000 | Kaye | |
| 6,196,506 B1 | 3/2001 | Wakai | |
| 6,347,496 B1 * | 2/2002 | Pinkins | E04G 23/0203 |
| | | | 52/366 |
| 6,354,779 B1 | 3/2002 | West | |
| 6,821,069 B2 | 11/2004 | Ikuta | |
| 6,976,292 B2 | 12/2005 | MacPherson | |
| 7,261,505 B2 | 8/2007 | Ernst | |
| 8,011,080 B2 | 9/2011 | Brown | |
| 8,075,234 B2 | 12/2011 | McClure | |
| 8,109,705 B1 | 2/2012 | Brown | |

| | | | |
|---|---|---|---|
| 8,142,123 B2 * | 3/2012 | Holscher | F16B 37/068 |
| | | | 411/84 |
| 8,197,169 B2 | 6/2012 | Ernst | |
| 8,303,222 B2 | 11/2012 | Yoshida | |
| 8,404,065 B2 * | 3/2013 | Miller | F16B 13/141 |
| | | | 156/92 |
| 8,404,865 B2 | 3/2013 | Miller | |
| 8,568,075 B2 | 10/2013 | Gaudron | |
| 9,039,338 B2 | 5/2015 | Kaye | |
| 9,394,932 B2 | 7/2016 | McDuff | |
| 9,587,661 B2 | 3/2017 | McDuff | |
| 9,777,493 B2 * | 10/2017 | Roberts | E04G 23/0203 |
| 10,927,872 B2 | 2/2021 | Wakai | |
| 2002/0015629 A1 | 2/2002 | Ito | |
| 2004/0065795 A1 | 4/2004 | Levy | |
| 2005/0053444 A1 | 3/2005 | Panasik | |
| 2005/0129482 A1 | 6/2005 | Wang | |
| 2006/0182515 A1 | 8/2006 | Panasik | |
| 2008/0253860 A1 | 10/2008 | McDuff | |
| 2009/0003962 A1 | 1/2009 | McDuff | |
| 2009/0053007 A1 | 2/2009 | Rafaeli | |
| 2009/0169331 A1 | 7/2009 | Pilon | |
| 2009/0249738 A1 * | 10/2009 | Brereton | F16B 13/0808 |
| | | | 52/741.2 |
| 2009/0279981 A1 | 11/2009 | Kinney | |
| 2010/0014937 A1 | 1/2010 | Holscher | |
| 2011/0059290 A1 * | 3/2011 | Gage | C09J 5/00 |
| | | | 156/91 |
| 2012/0328392 A1 | 12/2012 | Difante | |
| 2013/0223952 A1 | 8/2013 | Hickey | |
| 2014/0017031 A1 | 1/2014 | Prichard | |
| 2015/0043989 A1 | 2/2015 | Lind | |
| 2017/0306999 A1 | 10/2017 | McDuff | |
| 2017/0314600 A1 | 11/2017 | Daly | |
| 2017/0363137 A1 | 12/2017 | Markowicz | |
| 2018/0112697 A1 | 4/2018 | Williams | |
| 2018/0372139 A1 | 12/2018 | Daly | |
| 2019/0301509 A1 | 10/2019 | Philip | |

FOREIGN PATENT DOCUMENTS

| | | | |
|---|---|---|---|
| DE | 577002 A | 5/1933 | |
| DE | 1296883 B | 12/1966 | |
| DE | 1930994 C2 | 12/1970 | |
| DE | 2945859 A1 | 5/1981 | |
| DE | 4408341 A1 | 9/1995 | |
| DE | 44308341 | 9/1995 | |
| EP | 0010833 | 5/1980 | |
| EP | 0010833 A1 | 5/1980 | |
| EP | 0183882 | 6/1986 | |
| EP | 0183882 A1 | 6/1986 | |
| EP | 0410124 | 6/1990 | |
| EP | 0626522 | 11/1990 | |
| EP | 0410124 A2 | 1/1991 | |
| EP | 0626522 A1 | 11/1994 | |
| EP | 0837254 | 10/1997 | |
| EP | 0837254 A1 | 4/1998 | |
| EP | 1253331 | 3/2002 | |
| EP | 1253331 A2 | 10/2002 | |
| EP | 1286061 A | 2/2003 | |
| EP | 1286061 A1 | 2/2003 | |
| EP | 2808567 | 4/2019 | |
| GB | 591949 | 9/1947 | |
| GB | 591949 A | 9/1947 | |
| GB | 2256249 A | 12/1992 | |
| GB | 248771 A | 4/2002 | |
| GB | 2460121 A | 11/2009 | |
| GB | 2484771 A | 4/2012 | |
| WO | 0235104 A1 | 5/2002 | |
| WO | WO 0235104 A | 5/2002 | |
| WO | 2018007811 A1 | 1/2018 | |
| WO | WO 2018007811 A | 1/2018 | |

* cited by examiner

Toggle Bolt

Split Base Wall Anchor

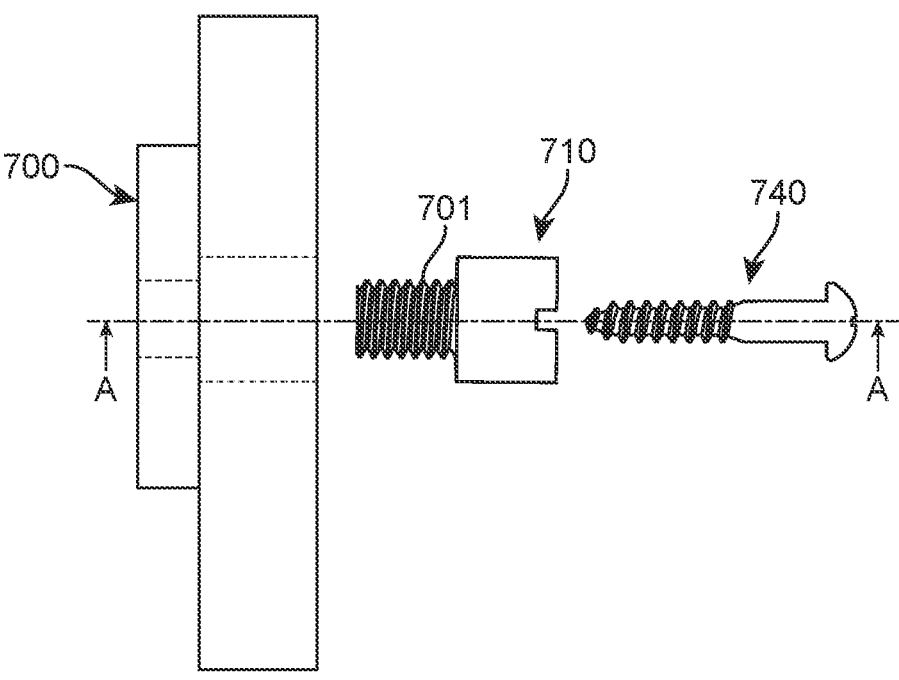
Fig. 9A
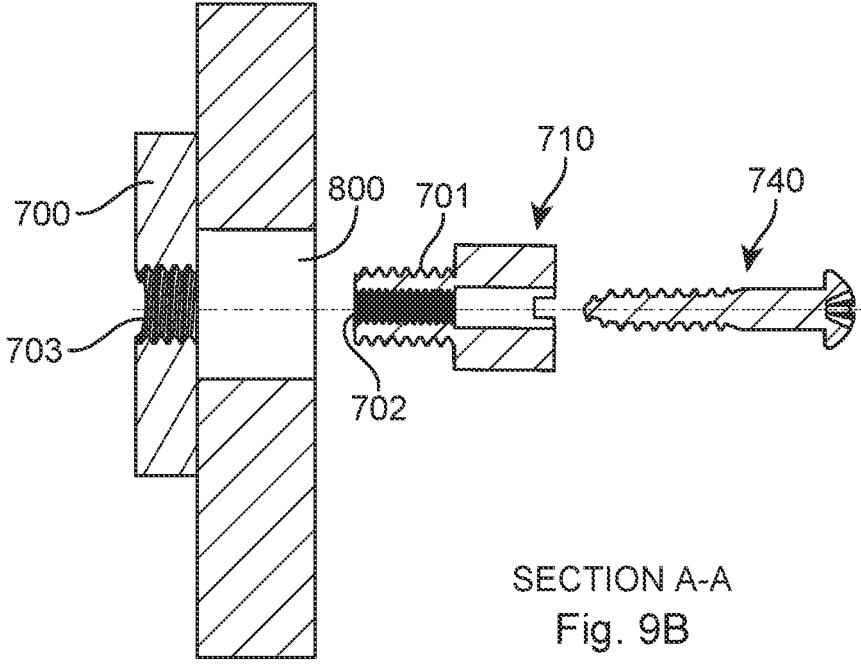
SECTION A-A
Fig. 9B
Fig. 9

HOLLOW WALL MOUNTING DEVICE

FIELD OF THE INVENTION

The present invention relates to an apparatus and a method for mounting objects onto a hollow wall or hollow ceiling outer surface using an adhesively affixed recessed back plate.

DESCRIPTION OF THE PRIOR ART

Methods of mounting objects onto hollow wall materials, such as gypsum board, wood panel, or cement board, are known. Prior art methods have employed, for example, devices such as toggle bolts, plastic anchors, or expanding shielded inserts. While spring loaded folding bi-winged toggles have enjoyed widespread use as hollow wall mounting devices, they nevertheless suffer shortcomings and disadvantages. Spring loaded toggle bolts, such as described in U.S. Pat. No. 2,013,503 by Pleister, and incorporated herein in its entirety by reference thereto, lack the ability to retain the rear face securing component if one removes the mounting screw when wishing to attach a different object. In such a device, the bi-winged folding head component falls away into the hollow wall cavity. Additionally, the spring toggle bolt device often requires the screw or bolt component to be threaded through the object to be mounted during passage of the toggle through a drilled wall aperture. Thus, in the case of a bi-wing spring toggle bolt, a sizeable or heavy fixture that requires multiple toggle style wall anchors, can be quite cumbersome when one wants to properly position multiple spring-loaded devices while aligning heavy objects. Moreover, the U-shaped profile of a spring-loaded bi-fold toggle device presents knife-like deformation to the rear surface of a hollow wall material, arising from the concentrated stress exerted by the edges of the toggle metal rails against a material such as gypsum drywall. Such concentrated forces compress or indent the wall material resulting in decreased firmness. To restore the desired firm tension, retightening of the toggle bolt is required to preserve its intended purpose. Progressive deformation creep resulting from continued re-tightening can lead to failure of the toggle head at its fold hinge or may result in wall board failure. At times, the toggle head wings may severely deform, tear, or even die-cut a friable wall material. In the case of heavy objects such as a mirror, one may select a relatively large toggle in an effort to decrease deformation tendency, however, such larger toggle selection results in exceptionally large wall openings that are difficult to repair when changing the room design.

Expanding screw shield wall anchors, such as split tip plastic screw sleeves, have also enjoyed widespread usage. However, these types of inserts have the disadvantage of degrading the inner surfaces of the wall material, especially gypsum board, when supporting heavy objects or objects that are frequently grasped. Additionally, sleeved screw wall anchors remain embedded in the wall board after removal of a mounting screw, thereby leaving a flange projecting from the wall board outside surface, thereby preventing filling and sanding the surface without extracting the bulging flange. Moreover, practitioners recognize such shielded screw inserts as gradually enlarging the desired wall bore in response to heavy load or cycles of loading and unloading, resulting in the increased downward deflection, or "tipping" of a mounted object. Such repeated loading and unloading may result in catastrophic dislodgement of the shielded screw from drywall due to degraded mineral filled gypsum board. Once such mechanical damage occurs, it is difficult to retroactively secure and realign the insert. Of general interest are wall mounting devices such as those described in U.S. Pat. No. 5,190,425 to Wieder et al. or U.S. Pat. No. 7,261,505 to Ernst et al., each incorporated in its entirety by reference thereto.

Therefore, a need exists for hollow wall mounting devices that overcome the deficiencies of prior art methods such as spring-loaded toggles that tend to cut into wall board and which fall away when the mounting bolt is removed, as well as plastic split-tip shielded screw inserts that tend to loosen, dislodge and severely degrade friable gypsum board, or which leave a prominent flange or collar disrupting the wallboard outer surface planarity after removing a mounting screw.

SUMMARY OF THE INVENTION

It is the general object of the present invention to provide a recessed wall mounting device, suitable for mounting objects onto hollow wall materials, such as for example, mirrors, shelves, handrails, grab bars, towel bars and other items, without the shortcomings of known prior devices.

Another object of the invention is to provide a self-supporting and recessed device for mounting an object along the front face of a hollow wall material, without the device component protruding beyond the front wall surface. Such a recessed, or flangeless, mounting device would result in quicker restoration of the wall face when the mounting location is changed.

Another object of the present invention is to provide a device and a method for mounting objects onto a hollow wall material which includes a self-supporting rear mounting plate with a planar or substantially planar surface contact profile, that is inserted end-on through an aperture of a hollow wall material, wherein the mounting plate is adhesively affixed to the back face of the hollow wall material, thereby providing an affixed, self-supporting rear wall mounting base. In this embodiment, the rear mounting plate inner surface is preferably adapted via machining, stamping, etching, or molding to enhance the retention of a deposited liquid adhesive to the plate's planar inner wall contact surface prior to adhesive curing, as well as post cure. Plate surface adaptions include, but are not confined to indentations, conical recesses, milled or drilled cavities, hemispherical recesses, wells, channels, chemical etchings, laser cut features, and cross hatching. Those having ordinary skill recognize that other textural adaptations along the inner plate surface topography may be performed to improve adhesive retention and inner plate bonding. Such additional inner plate surface adaptions are within the scope of the present invention.

Yet another object of the invention is to provide a recessed securing means to engage an object mounting screw. Several securing means are contemplated and tested by the inventor and described in greater detail in the embodiments and drawings herein. Securing means are incorporated into or alternatively are coaxial with the primary bore of the back plate. Securing means include threads tapped directly within the back plate primary bore. Other securing means may include a threaded nut, coaxial with the primary bore, and incorporated, for example, along the outer surface of the back plate, or within a recess within the bore cavity. Another securing means includes a double threaded sizing bushing. This sizing bushing may be described as a hollow cylinder having exterior shaft threads to engage back plate primary bore threads and interior surface tapped threads to engage mounting screw threads of a different caliper than the bore threads of the affixed back plate. In this embodiment, the sizing insert bushing may be changed to provide securing threads to engage a selected mounting screw, whether the mounting screw is a machine type thread or a wood type thread. Still other securing means include a dowel pin that is mounted with the primary bore cavity wherein the dowel is equipped with female thread to engage a mounting screw. In the case of the dowel embodiment, the dowel serves as an axle that is mounted within depressions or secondary bores located perpendicular to the direction of the back plate primary bore, along the primary bore cavity inner walls to permit the dowel to pivot perpendicular to the plate long axis.

Still another object of the invention is to provide a means of grasping the back wall mounting plate during end-on insertion, post insertion alignment, and adhesive tensioning of the mounting plate inner surface to the rear face of a hollow wall material. Grasping means are preferably released or disengage after adhesively affixing the back plate to the rear wall face. Grasping means include fiber or polymer strand lanyards attached to the back plate using engineered through-holes and secured to the back plate with such as loops, knots, or glue. Such strands are attached outboard of the back plate primary bore and may be used to provide tensioning force to urge the back plate into firm contact with the hollow wall back face. Other grasping means include detachable hand tools with a pivoting end component to enable end-on plate insertion, post insertion alignment, and to apply tension to enhance bonding between the adhesive and the rear surface of the wall material. Such hand tool grasping means include end threads adjacent to the pivot, as well as a tab to twistably engage a slot positioned within the back plate bore wall. Still other grasping means include a threaded rod or a mounting screw. In this instance, the back plate bore is equipped with a pivoting cylinder orthogonal to the bore and mounted perpendicular to the long axis of the back plate. The pivoting cylinder includes tapped threads to engage a mounting screw or threaded rod.

Another object of the invention is to provide a kit for recessed mounting of objects onto a hollow wall, the kit including:

(A) a self-supporting contiguous member mounting plate, the mounting plate, or back plate, including a substantially flat inner surface adapted to receive and retain an adhesive and a bore located near the midpoint of the plate long axis, the bore including securing means incorporated within the bore to engage a threaded mounting screw, (B) an adhesive for deposit upon the inner surfaces of the mounting plate to promote self-support of the plate along the rear surface of a hollow wall material, (C) means for grasping and urging an inserted mounting plate into alignment and firm contact with the rear surface of a hollow wall material, the grasping means including, for example, a fiber loop, a disengageable hand tool having a pivot segment and end effector, the tool end effector including male threads and side mounted prong for back plate engagement; and optionally (D) an array of mounting screws.

Components of the kit enable one to deposit an effective measure of an adhesive onto adaptations upon the inner plate surface outboard of the back plate bore threads, to couple a grasping implement to the back mounting plate, to insert the plate end-on through an aperture of the hollow wall material, to align the securing threads with the desired aperture position, to urge the inner surface of the plate into firm contact with the hollow wall material, and to disengage the grasping means implement, thereby providing a recessed mounting plate for engaging and securing an object mounting screw. The kit may optionally include an extension rod, a bar, a knob, and sizing inserts to modify the inner mounting plate threads so as to accommodate smaller diameter screw threads.

After diligent trials, the inventor has combined an adhesive with, a single member, contiguous back plate, the back plate including a primary bore equipped with tapped threads to engage a mounting screw, to thereby provide a self-supporting and recessed wall mounting device that eliminates many of the deficiencies of common prior art devices, such as loss of firm attachment upon cyclic loading and unloading, loss of mounting device when removing the mounting screw, and damage to friable wall material by device impingement. These and other objects and advantages provided by the present invention are set out within the specification, the drawings, and claims herein.

Definitions

As used herein, the term hollow wall material refers to a plurality of construction materials and positions. Hollow wall materials are utilized in a number of construction applications in which the board-like product is attached to load bearing or partition members, but which result in hollow regions between members. Those having ordinary skill in the art recognize that hollow wall materials include gypsum "dry wall," wood panel, composite panel, concrete panel, and the like. Gypsum board often refers to a friable center mineral laminated between two outer layers of paper or film. The term wall is herein intended to refer to bottom, top or side room positions, and thereby includes ceiling, side walls, and floor applications.

As used herein, the term single member mounting plate regards a back mounting plate that is formed from a single, planar contiguous piece of material rather than any multi-part mounting device such as certain prior art bi-folding devices, particularly prior art bi-winged toggle style folding devices. The contiguous plate described herein exhibits a planar contact surface that is divided into first and second segments by a primary bore positioned approximately midway along the long axis. In the present application, the term "substantially planar" is used to include back plate planar inner surface contact profiles that may also include certain adaptations to the flat profile such as machined channels for tool nesting, depressions for adhesives, wells for adhesives, and an array of surface adaptations which are intended to improve the retention of adhesives, such described within this specification. Preferred plate materials are referred to as rigid raw materials, thereby exhibiting substantially no defection in response to the load imparted by the mounting screw. The term rigid is herein intended to distinguish from certain prior art materials which readily deform during wall aperture insertions of which will deflect upon loading, such as for example, thermoplastic nylons and polyolefins Examples of rigid mounting plate materials include such substances as metal, wood, ceramics, thermosetting plastics, or plastics having a Vicat softening point above about 70 degrees Celsius, such as, for example ABS or thermosets. Back plate materials may be manufactured from a rigid material selected from the group consisting of metal, wood, ceramic, ABS, thermoset polymers, and plastics exhibiting a modulus of elasticity greater than 700 MPa at 23 degrees Celsius when tested in accordance with ASTM D 747.

As used herein, the term recessed refers to a device that resides behind the front plane of the wall material. The recessed device of the invention does not require any device component that projects above the front face of the wall material in order to become self-supporting. Those having ordinary skill in the art recognize, however, that certain objects to be mounted using the recessed plate devices of the invention may present a component that could reside above the wall plane, however, the addition of a such a front surface object component, such as a bracket, base, or extension collar, is not required for the device of the invention to be self-supporting.

As used herein, the term tensioning tool refers to a tool that engages with the primary bore, or alternatively adjacent to the primary bore of the single member contiguous mounting plate so as to serve as a grasping means to insert, align, and urge the plate into firm contact with the rear face of hollow wall material during the adhesive bonding of the plate to the rear wall surface. Tensioning tools preferably include pivot point adjacent to the end engagement tooling so as to permit approximately a 90-degree pivoting of the contiguous mounting plate along the plate long axis during end-on insertion through a wall aperture and subsequent return to a "T" conformation during the step of adhesively affixing the plate inner surface to the rear wall surface when an adhesive is disposed onto a segment of the plate inner surface that is outward of the primary bore. In some embodiments, the tool may engage directly with female threads provided within the plate bore or communicating with the bore cavity. The tool may also twist engage with one of more slots along the bore cavity or the outer surface of the back plate to temporarily engage the plate with the tooling end effector, in a lock and key or bayonet manner.

As used herein, the term sizing insert refers to a double-threaded reducing or enlarging bushings that may be used to modify the opening thread size that is engineered into a plate bore. Double threaded sizing bushings, also double threaded reducing bushings, may be described as cylinders having first outer male threads and a bore housing second inner female threads. Such sizing inserts may be advantageously used to reduce or modify the gage or the pitch of plate primary bore threads or dowel threads in order to receive an array of different diameter or pitch mounting screw threads. Sizing bushings may directly engage threads within the back plate bore, may engage the threads of an affixed nut, or may engage the threads of pivoting dowel located within the back plate bore cavity when such dowel is installed perpendicular to the primary bore axis and pivots along the plate long axis.

BRIEF DESCRIPTION OF THE DRAWINGS

Having thus generally described the nature of the invention, reference will now be made to the accompanying drawings.

FIG. 4 depicts perspective diagrams according to other embodiments of the present invention depicting hand tool grasping means and plate securing means useful in carrying out the invention;

FIG. 9 is a cross-sectional view of the use of a reducing bushing and back plate depicting the reduction of the thread size of a securing means incorporated into an affixed back plate.

DETAILED DESCRIPTION OF THE INVENTION

Figure 1:
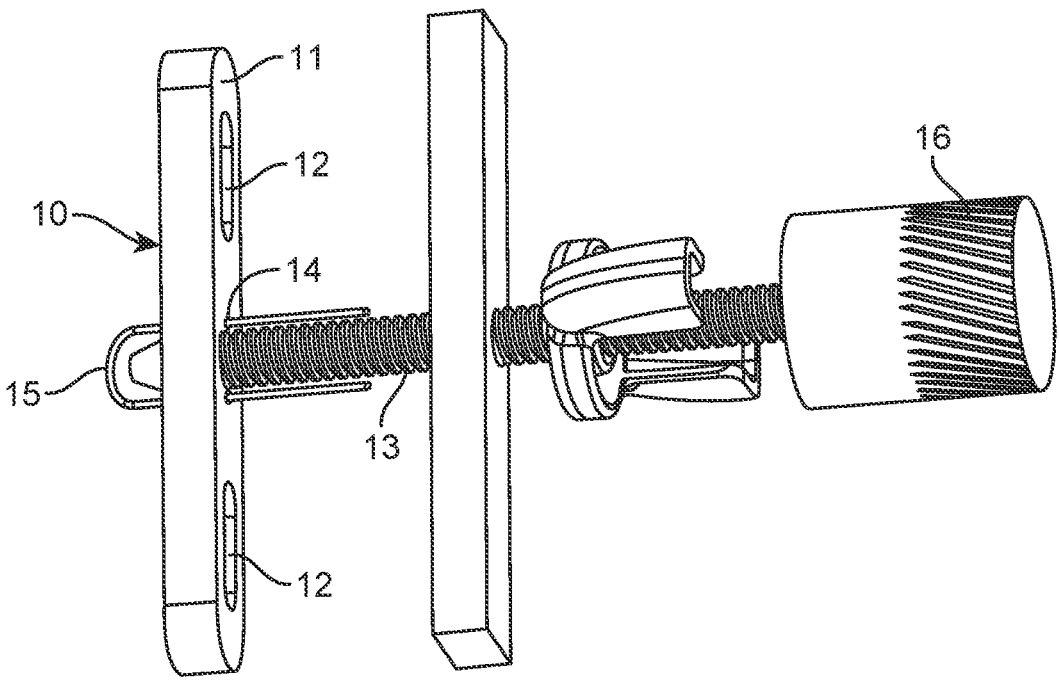
FIG. 1 is a perspective diagram illustrating one possible geometry of the self-supporting back mounting plate component in accordance with an embodiment of the present invention.

The invention includes a self-supporting mounting plate, also referred to as a back plate, which is adhesively mounted within a hollow wall material along the rear surface of the wall board. Wall apertures may assume many geometries including circular bores, slots, or irregular opening geometries. Upon insertion through a hollow wall opening, the back plate may be positioned in any number of orientations along a 180-degree axis ranging from horizontal to vertical. Such freedom of orientation permits placement of the back plate in inner wall environments where unseen inwall components may otherwise interfere. The self-supporting mounting plate preferably includes inner surface modifications to improve retention and attachment of an adhesive deposit, provided by chemical etching, channels, cross hatching, and recesses. The plate enables engagement with grasping means during insertion of the plate through a wall aperture so as to subsequently urge the plate into firm contact with the rear wall surface contact.

Grasping means may include at least one additional through hole other than the primary bore hole within the mounting plate through which a strand or lanyard, such as monofilament nylon line, may be threaded to secure and pull the plate into firm contact with the rear wall surface. In this embodiment, an adhesive is deposited along the inner surface of the plate outboard of the primary bore and fiber through-holes. The plate is inserted end-on through the wall slot or hole and stranded grasping means are used to guide the plate and to apply tension so as to urge the plate into firm contact with the rear surface during adhesive bonding. The fibrous strand may thereafter be detached from the affixed back plate. Other grasping means include special tools to temporarily attach to the back plate and readily detach after the adhesive has affixed to the rear wall surface and the back plate becomes self-supporting.

The Back Mounting Plate

A variety of self-supporting back plate geometries and plate materials are included within the scope of the present invention. Unlike many prior art hollow wall mounting methods, the back plate of the invention may be positioned within the hollow wall and adhesively attached, independent of any mounting screw. Relevant mounting plate materials include metal, thermoplastic polymers, thermoset polymers, and wood. Back plate materials preferably include inner surface modifications to enhance mechanical adhesion to a deposit of adhesive. In the case of a thermoplastic injection molded back plate, the planar inner, wall contact surface includes adaptions such as channels, depressions, pips, wells, crosshatching, chemical etching, laser etching and similar adaptions. Irrespective of the material type, back plate inner surface modifications enhance the retention of an adhesive deposit during the installation of the plate through the wall opening and help retain the adhesive during alignment and pulling the back plate into firm contact with the rear wall face. Back plate inner surface adaptions help retain a deposit of adhesive so as to reduce dripping, in the case of a deposit of a liquid adhesive, during the insertion and bonding to the wall rear face. Inner surface adaptions ensure that an adequate deposit of adhesive is provided to ensure good bonding to the hollow wall rear face.

In the case of an injection molded back plate, surface features may be conveniently molded into the inner surface to enhance adhesive acceptance upon the inner surface. For example, engineered surfaces may be molded to meet industry standard, SPI Grade D-3 with a Ra of 3.20 to 18.0 μm. Grade D-3 and other surface adaptions may be attained using drilling, sanding, laser etching, chemical etching, or EDM.

It is preferred to restrict the location of an inner plate surface adhesive deposit to the region of the plate surface outward of the plate's primary central bore and through-hole grasping means. Adhesive-retaining surface features help direct the user to deposit adhesive away from, or outboard of the back plate primary bore threads or pivoting hinge engagement and instead deliver adhesive upon modified mounting plate inner surface adaptions. Locational restriction ensures that no adhesive interferes with grasping means or securing means.

One back plate geometry includes a rectangular contact inner surface whose thickness is substantially less than its length. This quadrilateral bar-like design facilitates end-on insertion through a small wall aperture and provides strong mechanical performance owing to its span after aligning along the wall inside surface. Other contiguous planar back plate geometries conceived herein include "S" shaped, fan-shaped, boomerang shaped, bow-tie shapes, or other contiguous component geometries that extend from a primary bore within the plate. In the case of fan blade or curved geometries, distal elements may be symmetrical or asymmetrical relative to the primary bore. The objective of all single member, or contiguous back plate designs is to deliver maximum surface area along rear wall surface whilst keeping the end-on wall insertion aperture small. The exceptionally strong mounting strength of the inventive back mounting plate overcomes mechanical weaknesses of many prior art wall inserts such as the split component wall anchors. It is useful to provide a plate whose length that is about 4 times to about 12 times greater than the thickness, such as about 4 times to 8 times greater than the plate thickness. Plate length is limited by the cavity depth within the wall and may restrict the plate length from about 3 inches to about 5 inches. In contrast to the plate inner, wall contact surface, the back plate outer, or rear surface may have geometries the same as or different from that of the substantially planar inner surface. For example, the back plate outer surface may be convex or hemispherical to assist with insertion and orientation. For example, the plate outer surface geometry may be a longitudinally truncated cylinder, half cylinder, or turtle back shaped.

The Adhesive

Adhesives useful in affixing the back plate of the present invention to the wall rear surface include glues, epoxies, cements, and pressure sensitive adhesives, intended for bonding metal to wood, wood to paper, or construction adhesives. Preferable adhesives include pressure sensitive adhesives, epoxies, acrylic adhesives, and self-curing adhesives. Pressure sensitive adhesive (PSA) is a classification of non-reactive adhesives which advantageously rapidly adhere to an opposing surface upon compression contact. No solvent, water, or heat is needed to activate the adhesive. Adhesion to the plate, rapid high shear force bonding, adhesion to low surface energy materials and vibration control are desirable properties for the invention. Pressure sensitive adhesive exhibit with high shear resistance when applied to a surface, in particular to the backside of diverse types of wall board such as drywall and wood. The PSA may be applied by the user or applied robotically during a manufacturing process, and then protected by a removable film. Curing adhesives include polyurethane adhesives which react with moisture and increase viscosity in the presence of ambient moisture. Preferred curing adhesives reach useful set viscosity within 30 minutes to one hour, such as about 45 minutes after deposit. Preferable adhesives include chemistries that expand during curing to improve bonding by filling void spaces between the wall surface and the inner surface of the mounting back plate. Characteristics of useful adhesives include room temperature cure, thixotropy, sag resistance, low clamp time or rapid curing, and gap filling. Applicable polymeric materials include two-part epoxy, hot melt adhesives such as EVA, silyl modified polymer (SMP), polyurethane, polyacrylate, pressure sensitive adhesives, co-polyamides, and emulsion polymer isocyanates.

Adhesive sources include Bostik, Franklin Adhesives and Polymers, Titebond, the Gorilla Glue Company, Loctite, TMI Products (Stick Fast™), Mercury Adhesives, Satellite City Adhesives, and Master Bond Inc. Specific reactive adhesive examples include, Titebond Polyurethane Liquid Glue, Vibra-Tite 224 High Impact Structural Adhesive, Bostik Supergrip® 1582-082, Bostik Born2Bond™ Flex, Bostik Grip N Grab™, Bostik Pro-Cure™ Moisture-Cure Urethane Adhesive, Gorilla Construction Adhesive, and PPG Liquid Nails FUZE*IT® All Surface Construction Adhesive (LN-2000). One useful adhesive is a polymeric moisture reactive product such as a self-curing adhesive that is available from the Gorilla Glue Company, Cincinnati, Ohio. Pressure sensitive adhesive sources include 3M Corporation, Lenderlink, Toyo Ink America LLC, Shurtape Technologies, Gorilla Glue Company Henkel AG and Co., and Avery Dennison.

The Grasping Means

The inventive mounting device includes a grasping means to insert and align the back plate, such that an adhesively loaded back plate may be correctly located, and the primary plate bore may be optimally positioned within the wall aperture. Grasping means may include a second set of threads located concentric with the securing threads of the back plate primary bore but with a larger diameter stepped outside the primary securing threads. In such embodiments, the second set of threads are shallow with respect to the primary through-plate bore, and which are used as a temporary securing means during the step of affixing the adhesive. A pivoting thread-ended tool may be used to engage threads tapped into the primary bore or alternatively second larger partial bore, similar to a counter sink arrangement. In such alternate grasping means, a tool is attached using the outer diameter threads during insertion and adhesive affixing, then disengaged to reveal the primary bore threads that function to secure the mounting screw. Such tools comprise a handle, attached at a first end of a rod, a hinged joint proximate to the second end of the rod, the joint having the outermost end equipped with a threaded screw extension. The tool screw extension may thus engage threads within the primary plate bore or secondary plate countersink bore to provide grasping means which may be disengaged from the plate after adhesive bonding. The tool may further include threads along the rod body to engage a cylinder or nut to maintain back plate force during adhesive bonding. Additional grasping means include detachable hand tools equipped with a pivoting threaded end segment to directly engage portions of the plate. Such grasping tools may engage a slot, notch, or channel adjacent to the primary bore, or along the plate edge or outer surfaces. Such tools include pivoting twist locks, bayonet-style gripping tools, and detachable telescoping hooks or clips. Still other grasping tools include adapted scissor-like tools, such as modified alligator surgical forceps, or normally open split ring pliers. Grasping tools may be retracted after adhesively bonding the back plate. It is recognized that prior to adhesive bonding, the center bore of the plate is aligned such that it is approximately concentric with a drilled wall opening or at the desired mounting location of a slot opening.

Another grasping means includes one or more plate through-holes, located outboard from the plate primary bore through which fiber strand loops or ties are attached. Strand and cord lanyards are advantageously located adjacent to the plate center bore. Once the plate is inserted, the attached strands are sufficiently long as to extend through the wall aperture and beyond the front face of the wall material to permit tension to be applied to firmly urge the inner plate surface into contact with the rear face of the wall material. Clips or other convenient tools may be used to retain tension on the fiber strand or strands during adhesive bonding such as in the case of curing proceeds. Optionally, a probe may be used to assist with desired aligning of the back plate primary bore or to assist with the detachment of the fiber strand. One preferable fiber strand material is monofilament nylon, due to its high tensile strength. However, other fibers may be useful in carrying out the objects of the invention, including an ultra-high molecular weight polyethylene, such as Dyneema™. After affixing the back plate to the hollow wall rear surface, protruding fiber length may be severed or pulled out from plate through-holes and discarded. Monofilament may be successfully withdrawn even if an expanding curable adhesive partially envelops the strand.

The Securing Means

Securing means are incorporated within the bore of the back plate. The plate primary bore includes securing means such as primary bore threads, an affixed threaded nut, or a polymer insert to engage a threaded mounting screw. Other securing means include a hollow cylinder having outer threads to engage the plate primary bore threads and inner threads to engage the mounting screw. In the case of a back plate produced from a metal such as steel, a threaded insert similar to a conventional nut may be bonded to the outer surface of the back plate and concentric with the bore. For example, in the case of a nut, a recess may be machined or molded into the back plate to receive and adhere the nut using methods such as welding, crimping, gluing and the like. In such embodiments, when the back plate is inserted and adhesively affixed to the rear wall surface, the mounting screw may engage the bonded nut without the possibility of pulling the nut through the bore. Following the disposition of an adhesive, such as a moisture curing adhesive, onto the inner surface of the back plate, and outboard of the plate center bore, the plate may be inserted through a wall aperture and thereafter pulled into firm alignment using grasping means. In the case of a pressure sensitive adhesive, the bonding adhesive surface is preferably protected by a cover film until peeled away to activate the bonding surface.

As described herein, the invention provides a method of mounting an object onto the front face of a hollow wall, the method comprising:
   a) locating or drilling an aperture into a hollow wall,
   b) selecting a back plate equipped with mounting thread securing means,
   c) attaching a grasping means to the selected back plate,
   d) depositing an adhesive outboard of the securing means and the grasping means,
   e) inserting the back plate through the wall aperture, using grasping means,
   f) aligning the back plate along the rear face of the hollow wall material so as to position the securing means within the wall aperture,
   g) applying tension to the grasping means to urge the back plate inner surface into firm contact with the wall rear surface to affix the plate onto the wall rear surface,
   h) retaining tension during the adhesive bond time to provide a self-supported back plate,
   i) disengaging grasping means to provide a self-supported mounting device; and
   j) inserting a mounting screw having terminal threads into back plate securing means so as mount an object onto a hollow wall front surface.

Example 1

Referring to FIG. 1 of the drawings, a mounting device according to one embodiment of the present invention is depicted as a single member back plate 10, having a substantially planar inner contact surface 11, and having a fiber loop grasping means 15 and a primary bore with inner wall tapped threads to engage threads 13 on a tensioning tool equipped with knob 16. Plate 10 exhibits a greater length than width and greater length than thickness, so as to provide maximum surface contact with the rear face of the wall whilst maintaining minimal insertion hole diameter as a function of plate width and thickness. The back plate inner surface is shown with elliptical well depression adaptations, 12 to receive a dispensed measure of an adhesive. The fibrous lanyard 15 is depicted as having passed through at least one through-hole 14 adjacent to the primary bore, to grasp plate 10, during the end-on insertion through a wall aperture. Plate 10 would be loaded with a deposit of adhesive along inner surfaces, as for example within wells 12, such that the adhesive deposit is located away from, or outboard of the primary bore and primary bore inner cavity screw threads. The adhesive to be deposited into one or both well cavities is preferably an expanding moisture curing adhesive, such as offered by the Gorilla Glue Company, owing to its ability to expand, and thereafter spread outside of the cavity during the process of water reactive cure. Thus, in the example, one may dispense a measure of adhesive into the plate well while maintaining the threaded securing means unaffected during insertion, alignment, and curing of the bond between the inner device plate surface and the rear wall surface.

Example 2

Figure 2A:
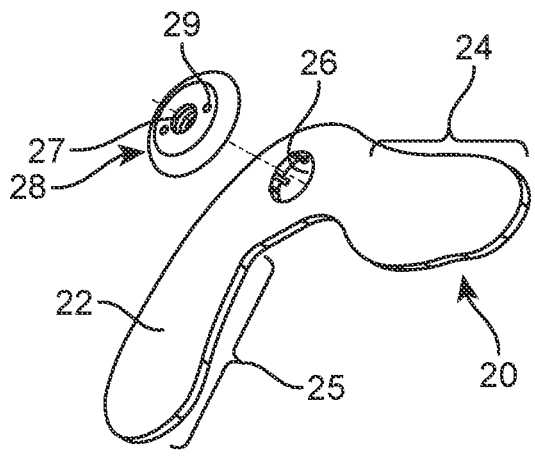
FIG. 2 illustrates a self-supporting back plate prior to bonding to the rear face of wall board with threaded insert installed within the primary bore, a monofilament grasping means, and wherein the back plate is divided by the primary plate bore into first and second curved segments.
Figure 2B:
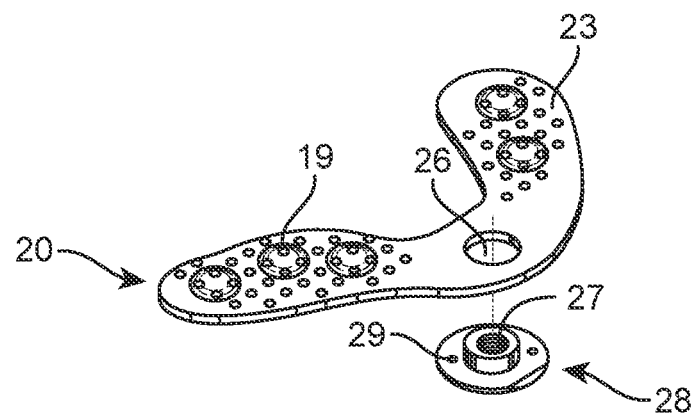
Figure 2C:
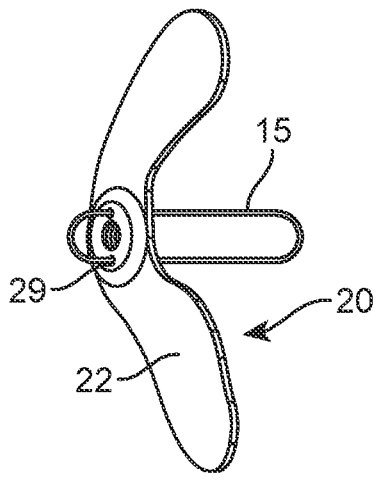

Example 2 illustrates another embodiment in accordance with the invention. FIGS. 2A, 2B, and 2C depict a device 20 for mounting an object onto the front surface of a hollow wall material including a single member, contiguous back plate having outer surface 22 and inner surface 23, as well as first and second lobed segments 24, 25 extending from primary bore 26. Inner plate surface 23 includes a plurality of hemispherical or cylindrical surface adaptions to receive and enhance the attachment of a deposit of adhesive. Plate inner surface adaptions are advantageously located along the first 24 and second 25 curvilinear segments, and outboard of the primary bore. Surface adaptations serve to visually direct the deposit of a measure of adhesive so as to not contaminate securing threads. Surface adaptions enhance adhesive retention during the step of installation, and later maximize surface bond strength. Threaded nut 28 is illustrated in the exploded diagrams 2A and 2B prior to pressing into bore cavity 26, to thereafter serve as a securing means to engage a mounting screw or a terminally threaded rod (not shown in figure) with female threads 27. Insert nut 28 includes at least one through hole 29 adjacent to tapped threads 27 for use as fiber lanyard grasping means. In alternate embodiments, surface adaptions within segments of plate 20 may include drilled apertures that penetrate to outer surface 22. An assembled mounting device is depicted in 2C as equipped with fiber lanyard grasping means 15, and ready to receive a deposit of adhesive 19 upon first and second segments of inner surface 23, and thereafter inserted through a hollow wall aperture to provide a recessed self-supported object mounting device.

Example 3

Figures 3A, 3B, 3C:
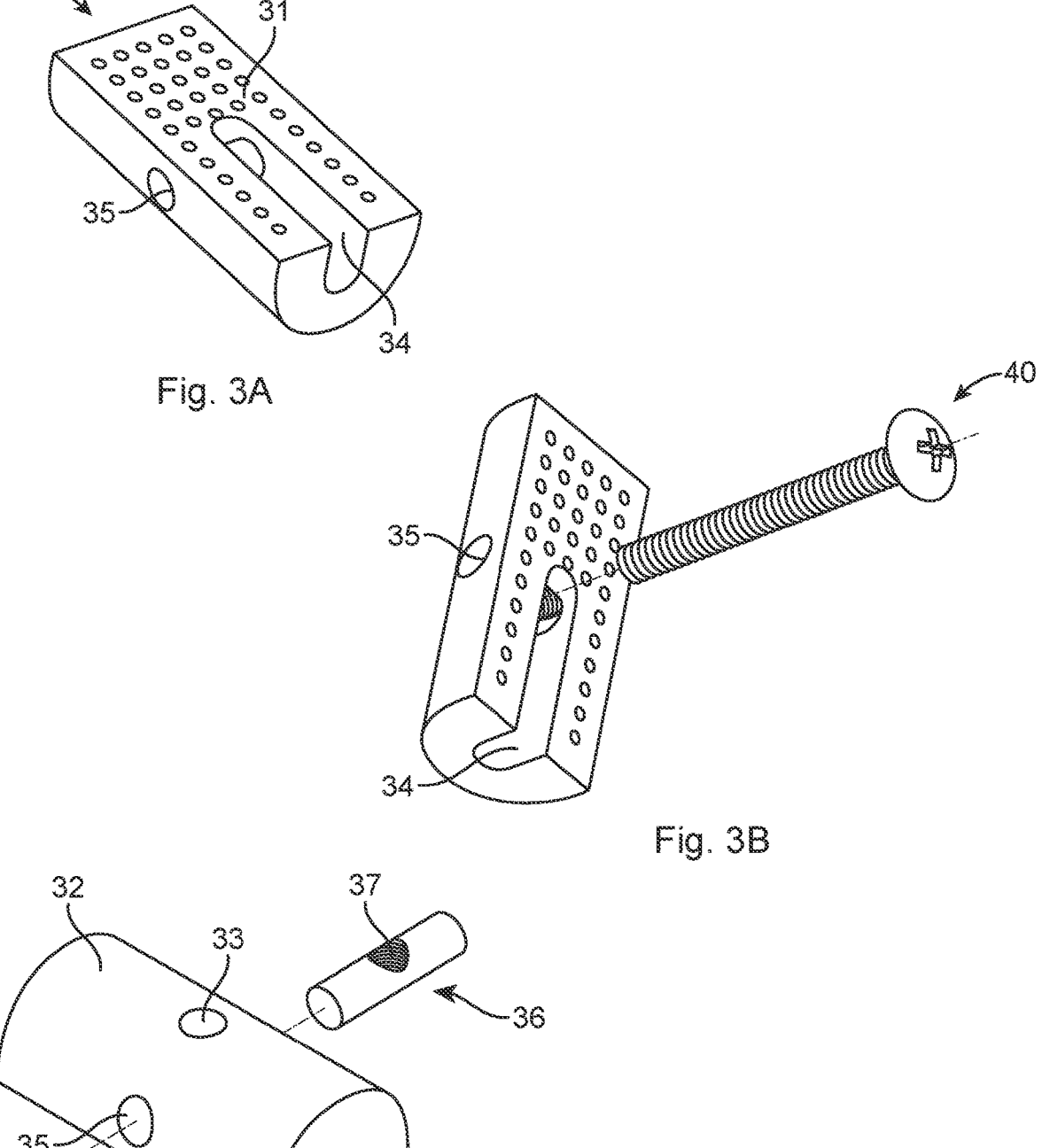
FIG. 3 is an exploded view of an embodiment of the invention illustrating use of a plate equipped with a channel along one segment of the inner surface to nest a pivoting grasping means and the plate equipped with a threaded pivoting dowel.

Referring to FIG. 3, the back plate 30 may be generally described as a solid aluminum longitudinally truncated semi-cylinder having a substantially planar and rectangular inner contact surface. Back plate 30 is herein depicted as having a substantially rectangular contact surface 31, a convex outer surface 32, a primary bore 33, a milled longitudinal channel 34, orthogonal secondary bore 35 and dowel 36. Back plate geometry may be obtained by longitudinally slicing a portion of the solid cylinder into two semi-cylinders, or in the case of a polymeric material, by injection molding to provide a longitudinally truncated cylinder. Dowel 36 includes a central bore that is equipped with female threads 37 to serve as securing means for a mounting screw such as 40. Threads within the dowel may be tapped directly into a dowel bore or alternatively may be attached to the dowel pin center and housed in a separate component equipped with female threads. When dowel 36 is installed into back plate orthogonal bore 35 it enables a mounting screw to engage dowel threads, so that when a mounting screw or a threaded rod 40 is threadably secured, the mounting screw or rod may pivot into channel 34 during the insertion of the device through a wall aperture. Prior to installing through the wall aperture, adhesive would be disposed along the hemispherical depressions provided on inner contact surface 31 to prepare the device for post insertion affixing onto the rear face of a hollow wall material. In Example 3, screw 40 performs both as grasping means during insertion, alignment, and bonding of an adhesive, and as a removable object mounting screw when back plate 30 is bonded to the hollow wall rear face and is self-supporting.

Example 4

Figure 4A:
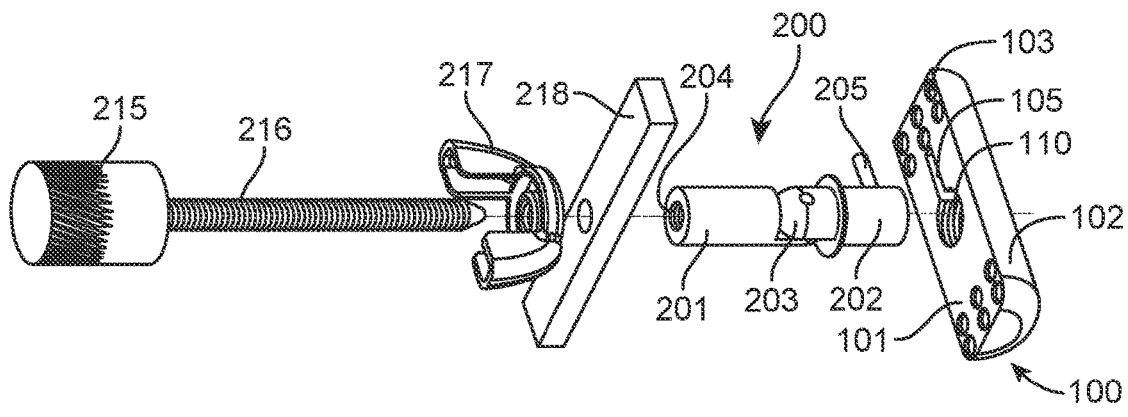
FIG. 4A is a perspective exploded diagram of a longitudinally truncated cylinder back plate adapted to engage a grasping tool in a twist key manner.
Figure 4B:
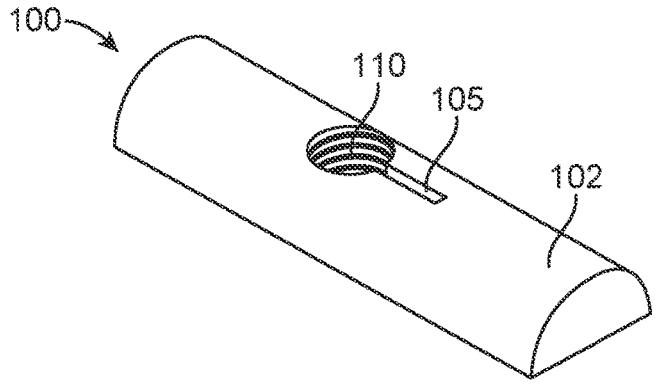
FIG. 4B is a rear view of a back plate having a slot and threaded bore extending through the rear outer surface.

This example describes two means of grasping the back mounting plate that are within embodiments of the invention. Two pivoting grasping tool end types, or end effectors are hereafter described together with mating back plate bore geometries. Referring to exploded diagram FIG. 4A, back plate 100 is depicted as a single member, or contiguous semi-cylinder, with a substantially planar inner surface 101 and a convex outer surface 102. Plate 100 is equipped with threaded primary bore 110, adhesive retention surface adaptions 103, and twist key slot 105 communicating with back plate primary bore 110. Slot 105 includes a vertical milling for insertion and for twist engagement. Referring to drawing FIG. 4B, back plate 100 includes slot 105 and threaded bore 110 that are machined from inner surface 101 through rear outer surface 102, such that prong 205 of tool 200 may be pressed from inner surface 101 to emerge beyond surface 102 through slotted passage 105 and threaded bore 110 to thereafter twistably grasp plate 100 along surface 102, whilst retaining threads in bore 110. In such embodiments, tool 200 may grasp plate 100, surface 101 would be provided with an adhesive, particularly in adaptions 103, then pivot at hinge 203 to permit profile reduction during end on insertion through a wall aperture. Following insertion through a wall aperture, back plate 100 would be pivoted again at 203 to resume a perpendicular conformation relative to tool 200. By use of tool 200, optionally extended by threaded rod 216, plate inner surface 101 would be urged into firm contact with a hollow wall rear surface to adhesively affix plate surface 101 along a rear hollow wall surface. After adhesive bonding between the rear wall surface and the inner plate surface, tool 200 would be twistably disengaged and withdrawn so that plate 110 would serve as a securing means for mounting objects. In alternate embodiments, primary bore 110 is equipped with a second interior circumferential bore slot, not illustrated, to twistably engage prong 205

Grasping tool end 200 is now described. Grasping tool outer end 201 may be fixed to a simple handle or coupled to a hand tool by way of screw or hand tools that are designed for snap coupling to accept different end fittings. Tool 200 includes outer end 201 attached to a first end of a pivot hinge 203, and a key end 202 attached to a second end of pivot hinge 203. Key end 202 includes prong 205. In this illustration, outer tool end 201 includes a bore and tapped threads 204 that may be attached to hand tool knob 215, by way of threaded rod 216. When tool 200 is grasped using an attached handle, it would be pressed into twist slot 105 of plate 110 and then twisted to provide a disengageable means of grasping back plate 100. Optionally, wing nut 217 and bar 218 may be employed to provide front wall surface tensioning following plate insertion when a disposed adhesive along surface 101 is affixed. Once tool 200 is attached to back plate 100, adhesive would be deposited upon adapted surface areas 103 of plate inner surface 101. Once attached, the back plate may be pivoted about the hinge within 203 to permit end-on insertion of plate 100, through a predrilled aperture (not illustrated) in a hollow wall material. Following insertion into hollow wall cavity, the back plate may again be pivoted to return the engagement angle between tool 200 and plate 100 to assume a more perpendicular conformation. The back plate would be tensioned into firm contact with the rear surface of a wall material using handle knob 215 and held under tension until the adhesive deposit achieves self-supporting bond strength. Tool 200 is thereafter disengaged to reveal female threads within bore 110 of the self-supported back plate 100. Female threads tapped within the bore walls of the recessed affixed plate 100 are thereafter prepared to engage an object mounting screw when wishing to mount an object along the hollow wall front surface.

Figure 4C:
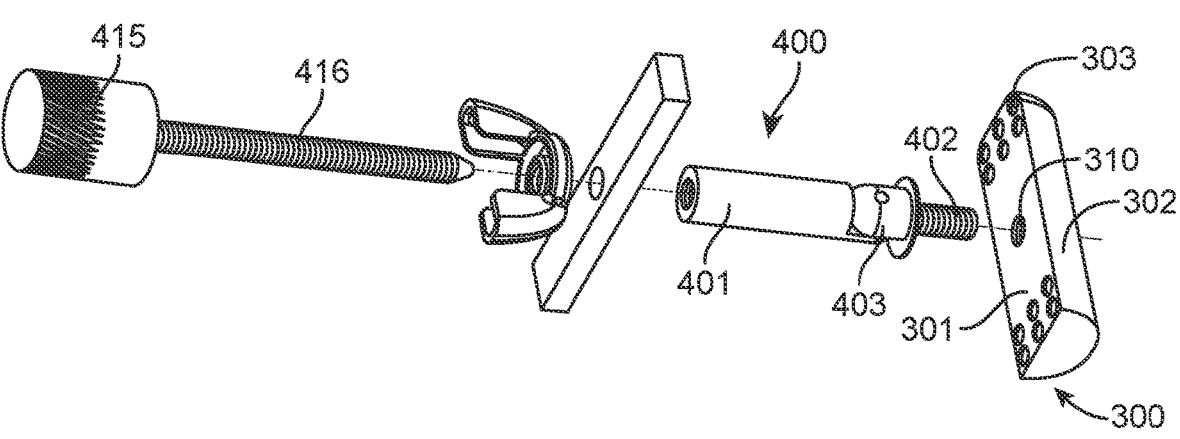
FIG. 4C is a perspective view of exploded diagram of a longitudinally truncated cylinder back plate equipped with female threads within the bore adapted to engage pivoting grasping tool with terminal male threads.

In FIG. 4C, back plate 300 is depicted as a single member, or contiguous semi-cylinder, with a substantially planar inner surface 301 and a convex outer surface 302. Inner surface 301 is equipped with primary bore 310 and surface adaptions 303 for adhesive retention. Primary bore 310 is equipped with female threads tapped into the walls of bore 310. Grasping tool 400 includes a handle end 401 attached to a first end of a pivot hinge 403, and threaded rod 402 attached to a second end of pivot hinge 403. In this illustration, outer handle end 401 will be attached to hand tool 415. When tool 400 is grasped using an attached handle, threaded rod 402 is turned to threadably attach plate 300 by securing with threads within 310. A measure of adhesive may be deposited onto the inner adaptation 303 outboard of tapped threads in bore 310. The back plate may be pivoted along pivot hinge 403 so as to provide a smaller profile to insert end on, and then pivoted about 90 degrees to present inner plate surface 301 to the rear wall surface for tensioning and affixing to the rear wall surface. After adhesive bonding, tool 400 is disengaged and withdrawn to provide a self-supported back plate 300, prepared to receive a mounting screw within threads of 310.

Example 5

Figure 5A:
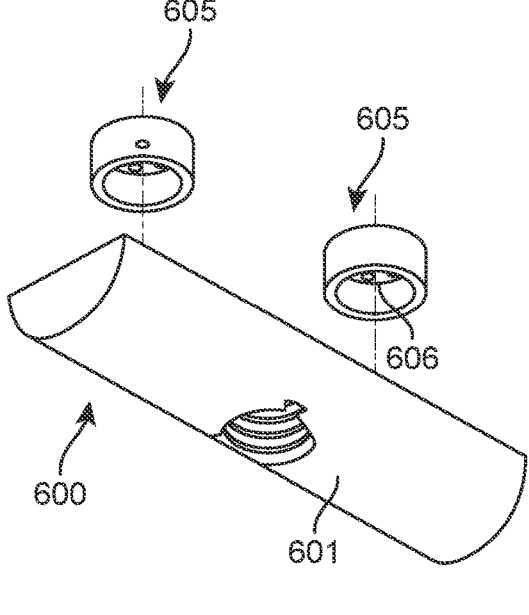
FIG. 5 is a perspective view of a back plate embodiment in which the plate is equipped with cylindrical wells on each segment to receive a deposit of adhesive.
Figure 5B:
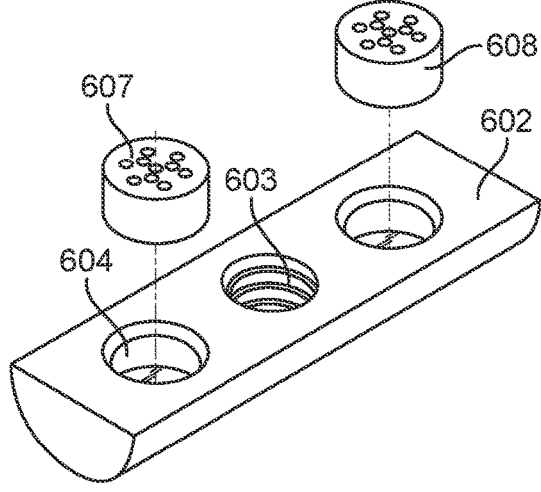
Figure 5C:
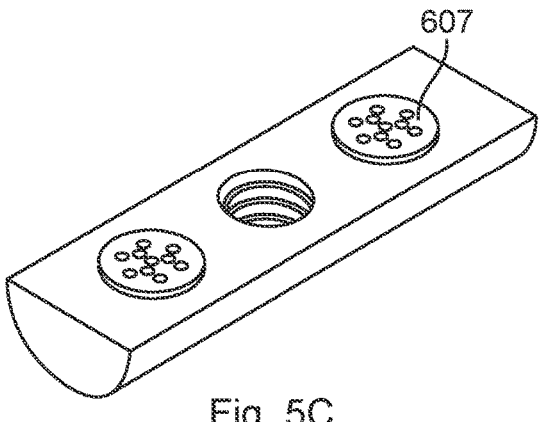

Referring to FIG. 5, back plate 600 is depicted as a longitudinally truncated cylinder, having a planar rectangular contact surface 602, a convex outer surface 601, a primary bore with tapped threads 603, and second and third partially bored wells 604. Adhesive retaining cup-like capsules 605 include an internal cavity 606, and an outer surface 607. The capsules are equipped with perforations within the top outer surface, communicating with internal cavity 606. As depicted in the 5C, when cavity 606 of capsule 605 is loaded with a measure of adhesive, and when the capsule is inserted into plate cavities 604, the adhesive would be expressed through surface 607 perforations onto back plate inner surface 602 when urged into firm contact with a hollow wall rear surface, thereby affixing the back plate to the wall surface upon adhesive cure. The adhesive preferably includes a moisture reactive expanding polyurethane. In preferred embodiments, the capsule is produced from a resilient polymer, including polymers selected from the group consisting of a polyolefin, a nylon, a polyester, a styrenic, and PVC. The capsule wall height 608 is greater than plate well depth 604, to result in the inserted, adhesive-charged capsule presenting its perforated surface 607 raised above surface 602, thereafter, to express a contained adhesive payload through perforations when the back plate is urged into firm contact with the rear wall surface.

Example 6

Figure 6A:
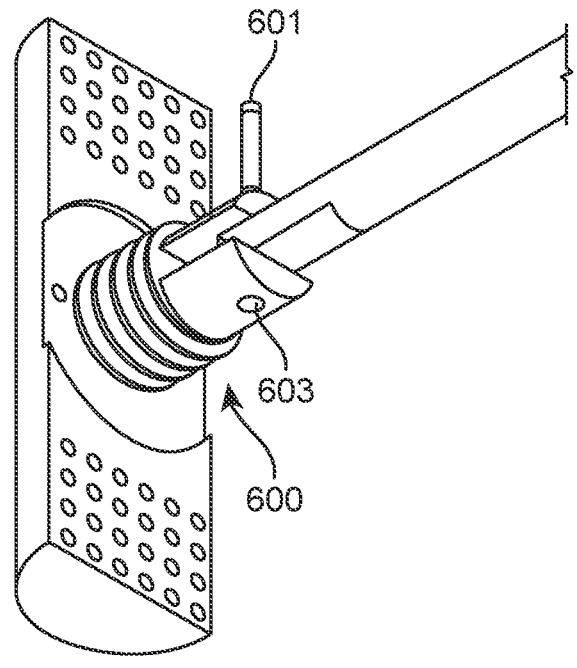
FIG. 6 is a perspective view of a back plate joined to grasping means, and prepared to couple to a tensioning hand tool.
Figure 6B:
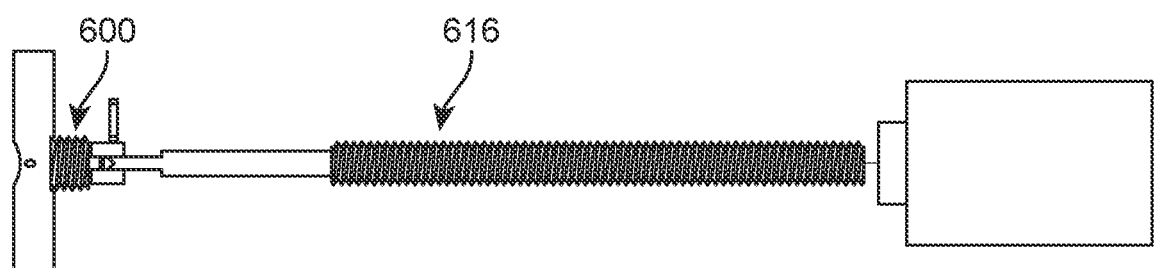

FIG. 6 depicts a method of engaging a grasping tool into the female primary bore threads, tapped within a back plate bore. FIG. 6 includes a perspective view and a side view of a hollow wall mounting device according to the invention. In the perspective view, the back plate primary bore is attached to the grasping tool terminal male threads. Grasping hand tool 600 is shown threadably engaged with the back plate. Tool 600 includes secondary bore 603 in the process of connecting shaft 616 and tensioning portion of the grasping end of the tool such that one may pivot about hinge pin 601. It is possible to change the back plate primary bore threads to accommodate a smaller gage fastener by inserting a double threaded reducing bushing into back plate primary bore threads. In this way the plate female threads may be adapted to receive smaller gage mounting screws by use of such a double threaded insert bushing. The reducing bushing is equipped with external threads matched to the threads of the primary bore of the back mounting plate, and internal threads selected to engage the threads of a mounting screw having threads of a different pitch or different caliber than those of the primary bore threads. In this example, one may affix the back plate to the inner wall surface and thereafter choose from a variety of mounting screws, by selecting and installing a double threaded sizing bushing insert to accommodate a desired mounting screw. Such sizing bushings are available from vendors such as McMaster-Carr. The use of a sizing bushing is particularly useful when changing exterior hardware. There are instances when one may wish to change the external appearance, such as changing a brass-colored mounting screw to a pewter colored screw. By use of the double tapped insert, one may readily change from a certain machine screw to a smaller diameter wood screw or a smaller diameter machine screw.

Example 7

Figure 7:
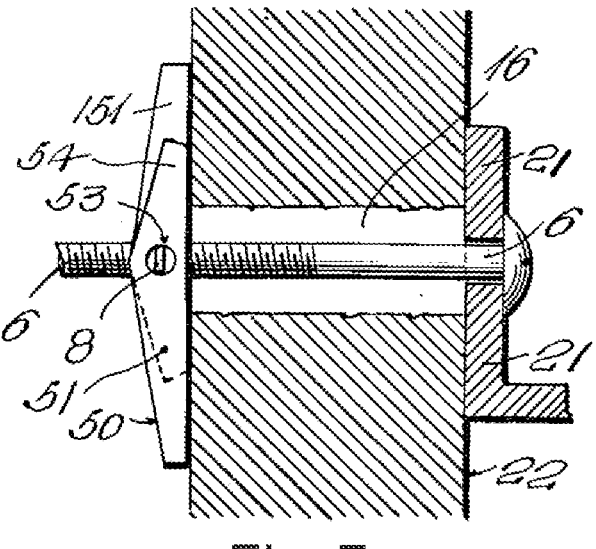
FIG. 7 is an illustration of a prior art spring-loaded folding toggle device toggle bolt fastener.

Referring to FIG. 7, U.S. Pat. No. 2,013,503, herein incorporated in its entirety by reference thereto, a prior art toggle is shown in side view, holding mounted object 21 through hollow wall aperture 16. This toggle bolt object mounting device of this comparative example includes the disadvantages of rear securing wings 50, 51 falling away behind the hollow wall when removing threaded bolt 6 from nut 8 if exchanging object 21, thereby precluding reuse of the assembly. The prior art has the additional disadvantage of utilizing folding U-shaped wings 50, 51 that present knife-like edges to a wall material. Such high pound per square inch contact pressure is prone to compressing or cutting into the paper skin of a material such as drywall.

Example 8

Figure 8:
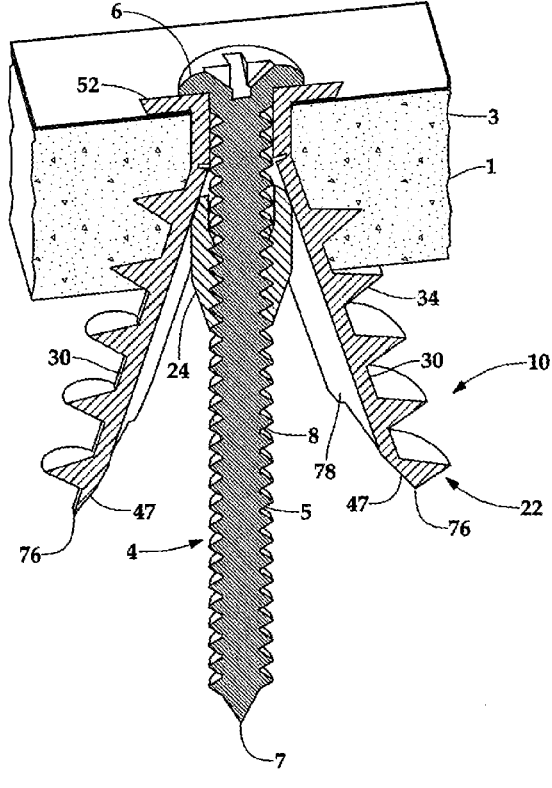
FIG. 8 is a schematic view of a prior art split plastic shield insert and mounting screw inserted in a drilled hole in a wall board.

FIG. 8 depicts a prior art conical shielded screw wall insert 10. In this comparative example, conical shield 10 is fully inserted into the wall opening. Mounting screw 4 is twisted into insert 10 to frictionally engage and expand the wall insert into two sections. Flange 52 remains above front wall surface to limit depth into the drilled wall aperture. In this comparative example, removal of mounting screw 4 for decorative modifications requires extraction of wall anchor 10 since flange 52 disrupts the front wall planarity. This prior art design represents an un-recessed type of device whose saw tooth projections 34, will damage and ultimately may weaken the strength of a mounted object when installed in gypsum dry wall.

Example 9

FIG. 9 depicts a section view of the optional use of a reducing bushing 710 to serve as an adaptor when using an object mounting screw 740 having different threads than the tapped threads within a self-supporting and recessed back plate 700. In FIG. 9 the plate 700 and the reducing bushing 710 are each shown in side view prior to cross-sectional view, such that internal plate bore threads 703 and internal bushing bore threads 702 may be revealed in section. Reducing bushing 710 is equipped with external male threads 701 and internal female tapped threads 702. As depicted in section, bushing 710 external male threads 701 would be threaded into tapped threads 703 of adhesively affixed back plate 700 by way of wall aperture 800 to provide a hollow wall object mounting device that would receive mounting screw 740 within bushing inner threads 702. This example demonstrates not only the advantage of a self-supported back plate to accept object mounting screws directly into threads within the primary bore but how the back plate could accept other mounting screws by way of an optional doubly threaded reducing bushing.

Having described the invention through drawings and examples, it should be recognized that modifications and variations to exemplar embodiments herein disclosed will be understood by those having skill in the art. Specific examples are illustrative rather than representing any limitations or the invention. The scope of the present invention is limited only by the appended claims.

We claim:

1. A recessed self-supporting device, suitable for mounting an object onto a hollow wall material, said wall material having a front surface, a rear surface, and an aperture joining said wall surfaces, the recessed device comprising:

a) a contiguous rigid back plate, said back plate including:
  i. a long axis,
  ii. a substantially planar inner contact surface,
  iii. an outer surface,
  iv. a bore centrally located along the substantially planar inner contact surface of said long axis, said bore defining plate bore walls, and
  v. first and second segments extending outward from said central bore of said long axis, said segment having features helping restrict the location of a deposit of adhesive thereon, said segment having contact surface features including at least one member selected from the group consisting of indentations, hemispherical recesses, pips, and depressions;

b) securing means comprising tapped threads disposed within said central bore walls, said threads equipped to engage an object mounting screw or threaded rod;

c) an adhesive, disposed upon said contact surface features of at least one back plate segment, said adhesive having a viscosity sufficiently high to be retained upon said segment surface features, thereby providing an adhesive-loaded back plate; and d) grasping means comprising a disengageable hand tool useful for end-on insertion and alignment of an adhesively loaded back plate, said hand tool including:

a handle, said handle comprising a bore having threads tapped therein, a pivot hinge, said pivot hinge having a first end and a second end, said first end attached to said handle, and said hinge second end directly attached to a mounting rod, said pivot hinge mounting rod equipped with terminal male threads to directly engage the central bore threads of said back plate, an extension rod having an outer diameter, said extension rod equipped with threads along the outer diameter, and equipped with terminal threads to engage said handle bore threads, a bar having a central aperture; and a nut equipped with inner threads tapped to engage the threads of said extension rod;

wherein said adhesive-loaded back plate may be inserted end-on through the hollow wall aperture, wherein said adhesive-loaded back plate inner contact surface may be urged into firm contact with the rear surface of the hollow wall material; and wherein, said nut and bar may provide tensioning to the end-on inserted adhesive-loaded back plate, thereby providing a self-supporting recessed device suitable for mounting an object onto the front surface of a hollow wall material.

* * * * *